United States Patent [19]

Knapp et al.

[11] Patent Number: 5,206,708
[45] Date of Patent: Apr. 27, 1993

[54] APPARATUS FOR THE SIMULTANEOUS DETECTION OF RANGES OF WAVELENGTHS

[76] Inventors: Gunter Knapp, Sorgerweg 16, A-8047 Graz; Bernhard Platzer, Wielandgasse 48, A-8010 Graz, both of Austria

[21] Appl. No.: 631,496

[22] Filed: Dec. 21, 1990

[30] Foreign Application Priority Data

Dec. 21, 1989 [DE] Fed. Rep. of Germany ....... 3942375

[51] Int. Cl.$^5$ .......................................... G01N 21/25
[52] U.S. Cl. ..................................... 356/416; 356/419
[58] Field of Search ........................ 356/416, 418–420

[56] References Cited

U.S. PATENT DOCUMENTS

| 3,877,818 | 4/1975 | Button et al. | 356/416 |
| 4,329,062 | 5/1982 | Haar et al. | 356/414 |
| 4,645,342 | 2/1987 | Tanimoto et al. | 356/318 |

FOREIGN PATENT DOCUMENTS

| 2731775 | 2/1978 | Fed. Rep. of Germany . |
| 3623345A1 | 1/1988 | Fed. Rep. of Germany . |
| 127779 | 10/1977 | German Democratic Rep. . |
| 2215038A | 9/1989 | United Kingdom . |

Primary Examiner—F. L. Evans
Assistant Examiner—K. R. Hantis
Attorney, Agent, or Firm—Bacon & Thomas

[57] ABSTRACT

An apparatus for the simultaneous detection of several ranges of wavelengths of polychromatic light radiation, using one detector for each detected range of wavelengths, includes an interference filter which filters the range of wavelengths to be detected out of the polychromatic light beam, and optical elements for guiding the polychromatic light beam to be detected. The optical elements include a first system of mirrors in the path of the incident polychromatic light beam for collimating it in a hollow-cylindrical manner, one mirror of the first system of mirrors being located at the center of the collimated light beam. The optical elements further include a second system of mirrors in the hollow-cylindrically collimated light beam that deflects this light essentially perpendicularly to the conceptual surface of the hollow cylinder and radially to the longitudinal axis of thereof. Photo-detectors associated with the particular deflection mirrors are mounted opposite the second system of mirrors to receive the deflected light. A common interference filter is mounted in the path of the beam between the deflecting mirrors and the photo-detectors, the deflecting mirrors and the associated photo-detectors being pivotable about the interference filter.

16 Claims, 5 Drawing Sheets

APPARATUS FOR THE SIMULTANEOUS DETECTION OF RANGES OF WAVELENGTHS

BACKGROUND OF THE INVENTION

The present invention relates to an apparatus for simultaneously detecting several ranges of wavelengths of polychromatic light radiation, and in particular to a multi-channel spectrometer with spectral background correction.

Conventionally, light intensity is determined at different locations of the spectrum using a polychromator. If design constraints require an especially compact photometer, or if especially high light fluxes must pass through the measurement device, then as a rule interference filters are used in order to filter out the spectral range of interest.

To make possible quantitative measurements, the measurement signal must be corrected for the spectral background. One known method is to install an additional interference filter which selectively eliminates the background radiation. However, this method requires that the light being examined be evenly split onto different filters. Inaccuracies in dividing the light beam may result to varying degrees in mistakes in correcting the background of a signal. Moreover, each measurement channel requires its own interference filter, so that when high-resolution interference filters must be used, the cost of such systems increases correspondingly.

One alternative is provided by a system with dynamic background correction. Such a system includes an interference filter capable of being tilted or tipped from which the light exits at a specific central wavelength depending on the angle of incidence. Due to the design of interference filters, as the angle of incidence increases, there is a shift of the central wavelength toward shorter wavelengths. The change of the central wavelength can be determined as a function of the angle of incidence by the formula below $$\lambda_\alpha = \lambda_0 \left[ 1 - \left( \frac{n_e}{n} \right)^2 \sin^2\alpha \right]^{\frac{1}{2}}$$

where
$\lambda$ = central wavelength for angle of incidence $\alpha$;
$\lambda_0$ = central wavelength for normal incidence;
$n_e$ = effective index of refraction of the filter;
$\alpha$ = angle of incidence of the light.

This relation applies to collimated light at an angle of incidence less than 10°. When this value is exceeded, the shift of the wavelength entails a distortion of the passband of the interference filter and a lowering of the transmission.

E. Cammann et al. describe in Fresenius Z. Anal. Chem. 1988, 331:336-341 a system of element-selective plasma-emission detectors for gas-chromatographical analysis. Dissociated compounds are pyrolytically decomposed into their elements in an energy-rich inert or noble gas plasma. The mixture so created is energized and the subsequently emitted light is fed by means of optic fibers to the element-specific detectors. An interference filter is provided for each detector and is tipped to and fro by 10 to 15 degrees at a rate of about 20/s. The detector determines the intensity of the measured and background radiation over a given element-specific range of wavelengths.

However, such systems are disadvantageous in that their mechanical components are exceedingly complex. With rapidly varying detected signals, the tipping rate must be very high to allow simultaneous determination of the measured signal and background. Rates beyond 20 Hz are technically very difficult to achieve, and therefore ultimately will be limited.

SUMMARY OF THE INVENTION

It is an object of the present invention to create apparatus which overcomes the drawbacks of the prior art and permits accurate simultaneous measurement of several ranges of wavelengths of polychromatic light radiation.

This object is achieved by providing an apparatus which, according to a preferred embodiment of the invention, includes elements for guiding a polychromatic light beam, the optical means including a first mirror system located in the path of the incident polychromatic light beam for collimating the polychromatic light beam into a hollow-cylindrically collimated light beam, wherein one mirror of the first system of mirrors is mounted at the center of the collimated light beam and including a second system of mirrors, the second system including a plurality of deflecting mirrors located in the path of the hollow-cylindrically collimated light beam, for deflecting the collimated light beam essentially perpendicularly to the conceptual surface of the hollow cylinder and radially to its longitudinal axis. A common interference filter is mounted opposite the second mirror system in the path of the beam between the deflecting mirrors and the photo-detectors, the deflecting mirrors and the associated photo-detectors being pivotable about the interference filter.

Preferably a point light-source is used as the emitter of the polychromatic light beam. Light radiation from a plasma is then transformed using known accessories, such as stops and optic fibers, into a point light source.

In a further preferred embodiment of the invention, the hollow-cylindrically collimated light beam may be produced, where called for, by using an optical system comprising lenses which replace the above said first system of mirrors. However, when lenses are used, the useful range of wavelengths will be narrower than for mirror optics.

In another preferred embodiment of the invention, the interference filter is mounted to a wall at the center of a hollow-cylindrical filter holder, to which the deflecting mirrors and detectors are affixed in a pivotable manner.

Preferably, the interference filter is located substantially in the shadow of the plane mirror of the first mirror system that is mounted at the center of the hollow-cylindrically collimated light beam.

The interference filter is so inserted inside the hollow-cylindrically collimated light beam that its surface normals are substantially at 90° to the longitudinal axis of the collimated light beam. In the apparatus of the invention, the interference filter is present simultaneously in the path of the light of several measurement channels arrayed in several superposed planes and axially offset and radially displaceable relative to the interference filter. A measurement channel comprises a deflecting mirror opposite the light-incidence surface of the interference filters and an associated deflector opposite the light-exit surface of the interference filter. To amplify the measured signal, each measurement channel also includes a conventional pre-amplifier. Preferably, conventional photo-diodes, but also fairly small photomultipliers are used as detectors.

In another preferred embodiment of the invention, the light beams exiting from the interference filter are matched, using optical means, in front of the photodetectors, to the particular size of the active detector area. The resulting increase in illumination intensity at the detector surface is translated into an increase of spectrometer sensitivity.

Those specular surfaces of the deflecting mirrors that face the light incidence surface of the interference filter are designed in such a manner that the normals to the specular surface subtend an angle of substantially 45° in respect to the longitudinal axis of the hollow-cylindrically collimated light beam.

The apparatus of the invention offers the advantage of requiring only one interference filter for the simultaneous measurement of several different wavelengths. Where a polychromatic light beam is concerned, both the intensity in a given range of wavelengths and the background intensity in a nearby range of wavelengths can be determined simultaneously. The apparatus is easily adjusted by rotating the detector units (measurement channels) and/or by rotating the interference filter about the axis of the hollow-cylindrically collimated beam. The mirrors and the detectors are always accurately positioned opposite each other. As a result of this easy adjustment of the transmission angle in the interference filter, wider tolerances are possible in the central range of the wavelengths of the interference filter. This simplifies filter manufacture and hence spectrometer costs can be lowered.

In yet another preferred embodiment of the invention, the first system of mirrors includes a concave mirror which acts as a stop, with a central aperture for the incident polychromatic light beam and a plane mirror opposite the central aperture and reflecting the incident polychromatic light beam toward the concave mirror, the light beam being guided from the concave mirror in collimated form past the plane mirror toward the second system of mirrors.

Preferably, the plane mirror is of circular cross-section and has an outside diameter essentially matching the inside diameter of the collimated light beam. The plane mirror is located in a concentric, circular aperture, inside the housing, for the light reflected from the concave mirror, the inside diameter of this aperture essentially corresponding to the outside diameter of the collimated light beam. The hollow-cylindrically collimated light beam passes through the annular gap so formed and arrives at the second system of mirrors with the filter-detector unit.

Both the plane mirror and the interference filter may be advantageously bonded to a quartz disk affixed by its outside diameter inside the spectrometer.

The second system of mirrors includes several, preferably up to four, deflecting mirrors which are axially offset from the common interference filter.

Each deflecting mirror and an associated photodetector is advantageously affixed on a support plate and rotatable about the longitudinal axis of the hollow-cylindrically collimated light beam. This support plate comprises an essentially central and circular clearance having a diameter which substantially matches the outside diameter of the filter holder to which the support plates are mounted in rotatable manner.

Preferably, nearly-circumferential slots are present in the wall of the filter holder opposite the light entry and exit surfaces of the interference filter, one part of the slots serving to guide the deflecting mirrors, another part as transmission apertures for the light beams coming from the interference filter. The deflection filters are so mounted on the support plate that they project by their specular surface, through corresponding slots, into the hollow-cylindrical inside of the filter holder.

In a further preferred embodiment of the invention, two or more (preferably three to six) interference filters are superposed at the center of the hollow-cylindrically collimated light beam and are relatively rotatable about a common axis essentially corresponding to the axis of the collimated light beam. In such an arrangement, several, for example four, deflecting mirrors and associated photo-detectors are mounted in superposed planes and in pivotable manner about each interference filter. In an offset arrangement of the individual interference filters, the particular set of deflecting mirrors associated with each further interference filter is axially and circumferentially shifted relative to the deflecting mirrors of the other interference filters, averting thereby mutual impediments among the deflecting mirrors of the individual planes. In this arrangement, the deflecting mirrors can be distributed over the circumference of the collimated, hollow-cylindrical light beam in such a manner that pencils of light will be deviated from different segments of the light beam and the entire light beam circumference shall be used to the maximum.

The specular surfaces of the deflecting mirrors of the invention are each formed by the single sloping surface of a parallelipipedic prism. The prisms of the invention are made of plastic or metal, for instance brass, and comprise a gilt, silvered or aluminized surface. An exemplary specular prism according to the invention may be 30 mm long, 5-10 mm wide, and 1-5 mm thick.

Advantageously, the deflecting mirrors can be radially displaced in a plane perpendicular to the longitudinal axis of the collimated light beam. For that purpose, the deflecting mirrors are displaceably mounted in a groove in the support plate and can be tightened in place using a tightening screw. This may be necessary at times if two pencils of light are deviated from the light beam that they impinge with only slightly different angles of incidence on the interference filter. In order to prevent mutual hampering (screening) of the specular surfaces, the deflecting mirrors are so adjusted that the more remote deflecting mirrors pick up the light beam farther inward and the deflecting mirrors above pick up the light beam farther outward.

In general, the inside diameter of the hollow-cylindrical filter holder matches the outside diameter of the cylindrically collimated light beam. The filter holder is adjusted in such a way that the longitudinal axis of the hollow-cylindrically collimated light beam corresponds to the longitudinal axis of the hollow-cylindrical filter holder and that the light cylinder inside the filter holder shows a uniform "wall thickness".

In an apparatus according to a further preferred embodiment of the invention, the interference filter(s) and/or the support plates are rotatably mounted about the axis of the hollow-cylindrically collimated light beam.

BRIEF DESCRIPTION OF THE DRAWINGS

The above invention is elucidated further in relation to the Figures described below.

DETAILED DESCRIPTION OF THE INVENTION AND PREFERRED EMBODIMENTS

Figure 1:
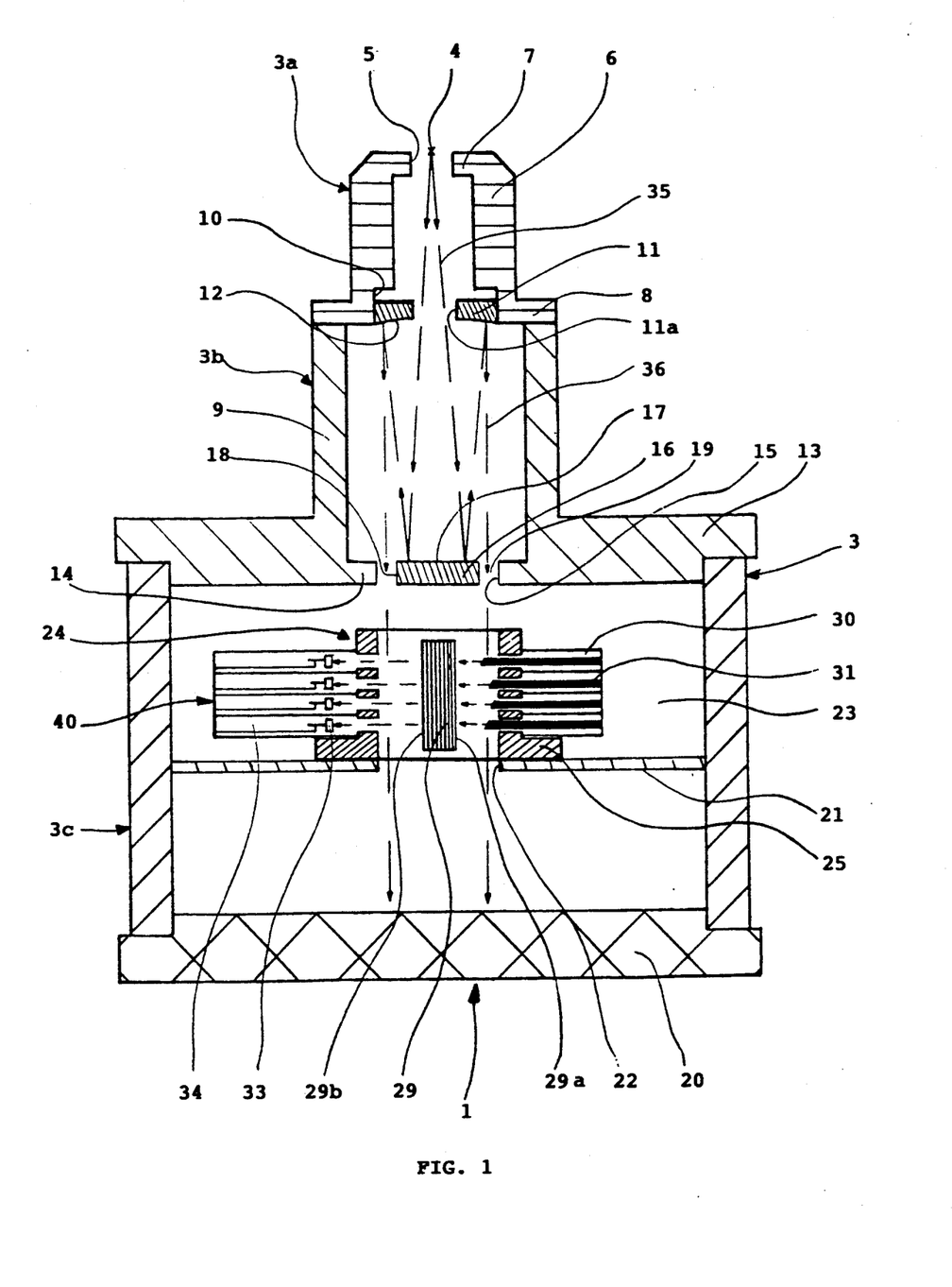
FIG. 1 is a longitudinal section of an apparatus according to a preferred embodiment of the invention.

FIG. 1 schematically shows a longitudinal section of an interference-filter spectrometer 1 of which the housing comprises a housing bottom 20 connected to a three-part, detachable housing case 3. The housing case 3 is constituted by the three superposed case sections 3a, 3b and 3c.

The dome-shaped, least-diameter case section 3a is mounted opposite the point light source 4 and encloses the first housing segment. A light entry aperture 5 is present in the upper wall 7 of the case section 3a facing the light source 4. The inside of the cylindrical wall 6 of the case section 3a comprises a circumferential step-like widening providing the seat 10 for a concave mirror 11. The seat 10 rests by its outer edge 8 on the end, facing the light source 4, of the sidewall 9 of the cylindrical case section 3b of the second housing segment. The concave specular surface of the concave mirror 11 is on the side away from the light source 4.

The case section 3b encloses the second housing segment and is also provided at its foot with a circumferential and outwardly pointing edge 13 whereby it rests on the third housing segment. A circumferential annular flange 14 is located at the inside wall of this housing segment near the foot. A circular plane mirror 16 of small diameter is concentrically seated in the aperture 15 defined by the annular flange 14, and its specular surface 17 faces the specular surface 12 of the concave mirror 11 to form a first system of mirrors for collimating a polychromatic light beam in a hollow-cylindrical manner. The circumference 18 of the plane mirror 16 is uniformly distant from the annular flange 14 and accordingly an annular aperture 19 is formed which links the housing part, defined by the case sections 3a and 3b and bearing the collimating optics, with the third case section containing the filter-detector unit.

The third housing segment is formed by the housing bottom 20 and the peripheral case segment 3c which is detachably connected at one end to the bottom 20 and, at the other end facing the second housing segment, to the edge 13 of the central case section 3b. An intermediate floor 21 parallel to the bottom 20 is formed at about mid height on the inside of the case surface 3c. A circular aperture 22 is present essentially centrally in the intermediate floor 21 and its diameter essentially corresponds to the outside diameter of the annular aperture 15 between the plane mirror 16 and the annular projection 14 at the case section 3b.

An essentially cylindrical filter holder 24 is affixed by its base flange 25 to the intermediate floor 21 in the space formed by the case section 3c and the circumferential edge 13 of the case section 3b. The hollow-cylindrical borehole 26, centrally present in the filter holder 24, and the aperture 22 in the intermediate floor 21 are of essentially identical diameters and coincident.

Four superposed and equal pairs of slots 28a, 28 are present in the cylindrical wall 27 of the filter holder 24. The slotted regions of the wall 27 are interrupted by two continuous narrow wall segments 37 free of slots and mutually offset by 180°. Accordingly, each slot 28a is opposite a slot 28b at the same height. The slot ends of the slots 28a and 28b do not touch each other, but rather are evenly apart on account of the wall segments 37.

An interference filter 29 with rectangular or circular cross-section is inserted in the cylindrical space formed by the bore 26 in the filter holder 24, the normal to the filter surface being essentially parallel to the intermediate floor 21 bearing the filter holder 24. The interference filter 29 is rigidly joined to the filter holder. The interference filter 29 extends essentially over the entire length of the slotted zone of the holder 24, whereby the interference filter forms a separation surface between the slots 28a that are opposite the light entry surface 29a of the interference filter and the slots 28b which are opposite the light exit surface 29b of the interference filter.

Each measurement channel of the spectrometer is formed by a support plate 30 pivotably supported about the filter holder 24. The path followed when a support plate 30 is pivoted is essentially parallel to the intermediate floor 21 bearing the filter holder 24. Each support plate is associated with a slot 28a and its opposite slot 28b. The deflecting mirror 31 is mounted to the support plate on the side facing the slot 28a, and this deflecting mirror is made of a flat metal parallelipiped, the specular surface 32 of the deflecting mirror 31 being formed by the slanted side surface facing the light entry surface 29a of the interference filter 29. The normal to the specular surface 32 is at an angle of about 45° to the intermediate floor 21 or the longitudinal axis of the bore 26 in the filter holder 24. The thickness of the deflecting mirror 31 is less than the height of the slots 28a, so that the deflecting mirrors 31 can be made to pass through the slots 28a toward the light entry surface 29 of the interference filter 29 into the inner space of the filter hold 24. Mirrors 31 thus form a second system of mirrors located in the path of the holder-cylindrically collimated light beam formed by mirrors 11 and 16 of the first system of mirrors.

A photo-detector 33 and an associated pre-amplifier are affixed opposite the deflecting mirrors 31 to the side of the support 30 that faces the slot 28b and the light exit surface 29b of the interference filter 29.

Figure 2:
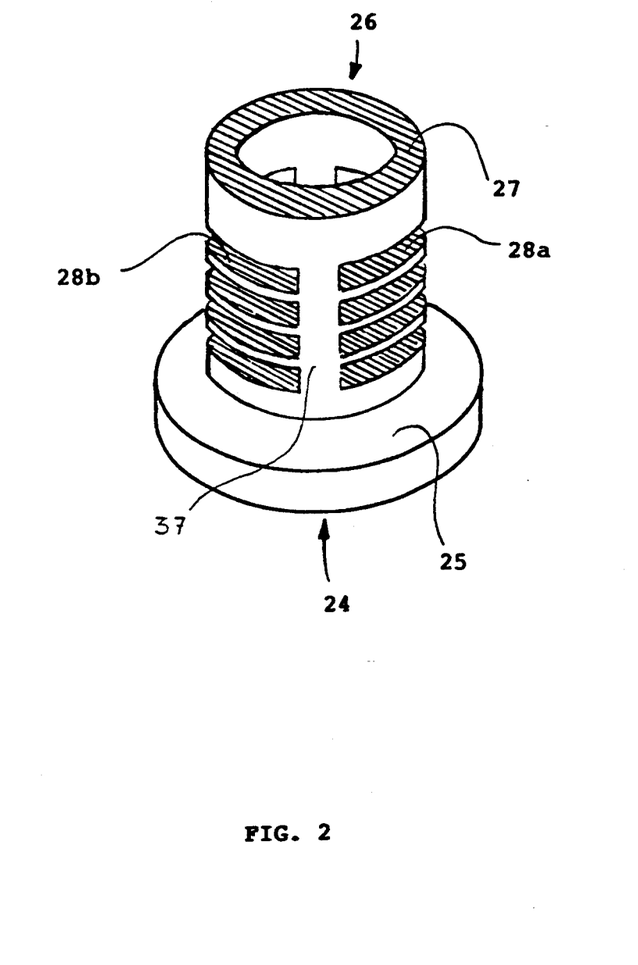
FIG. 2 is a perspective elevation of a filter holder according to a preferred embodiment of the invention.

FIG. 2 shows a preferred embodiment of a filter holder 24. The wall 27 of the hollow cylinder 26 merges at the base into the flange 25. Four superposed and circumferential slots 28a are present in identical form in one case-half whereas the other case-half comprises the superposed identical slots 28b. The division into two slotted case halves is implemented by means of two narrow, columnar wall segments 37.

Figure 3:
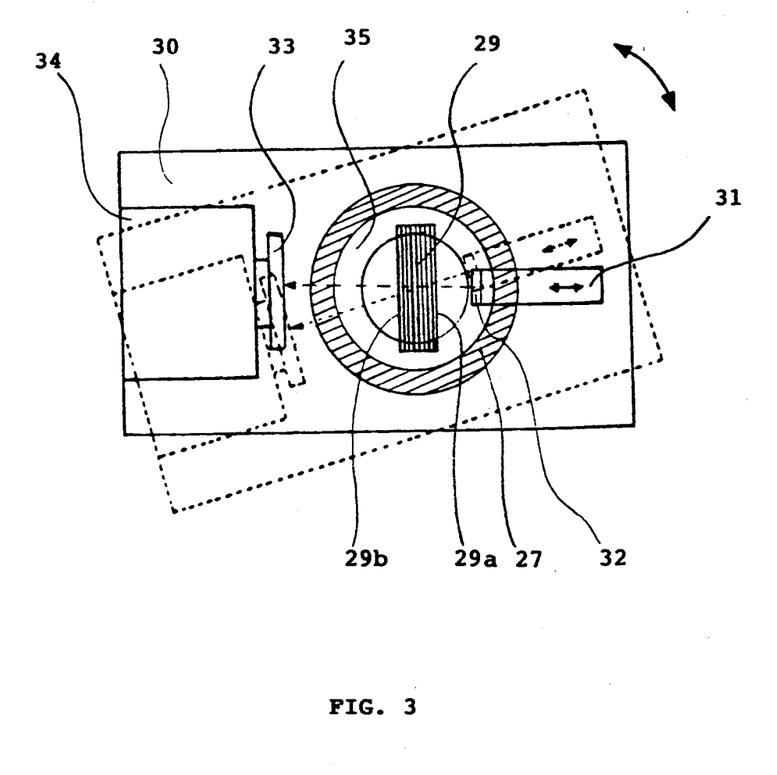
FIG. 3 is a top view of a measurement channel rotatably mounted on the filter holder of FIG. 2.

FIG. 3 is a top view of a support plate 30 which is pivotable (dashed contour) relative to the interference filter rigidly affixed to the filter holder 24. It follows that when pivoting the support plate 30 relative to the interference filter 29, the deflecting mirror, the photo-detector 33 and preamplifier 34 are made to pivot simultaneously.

The angle of incidence of a light beam deviated (dashed arrow) by the deflecting mirrors 31 varies with the rotation of the support plate 30. Because the photo-detector 33 moves along simultaneously, the light beam exiting from the interference filter always shall be detected. The spacing of the specular surface 32 from the light entry surface 29a of the interference filter 29 is adjustable in the process.

Figure 4:
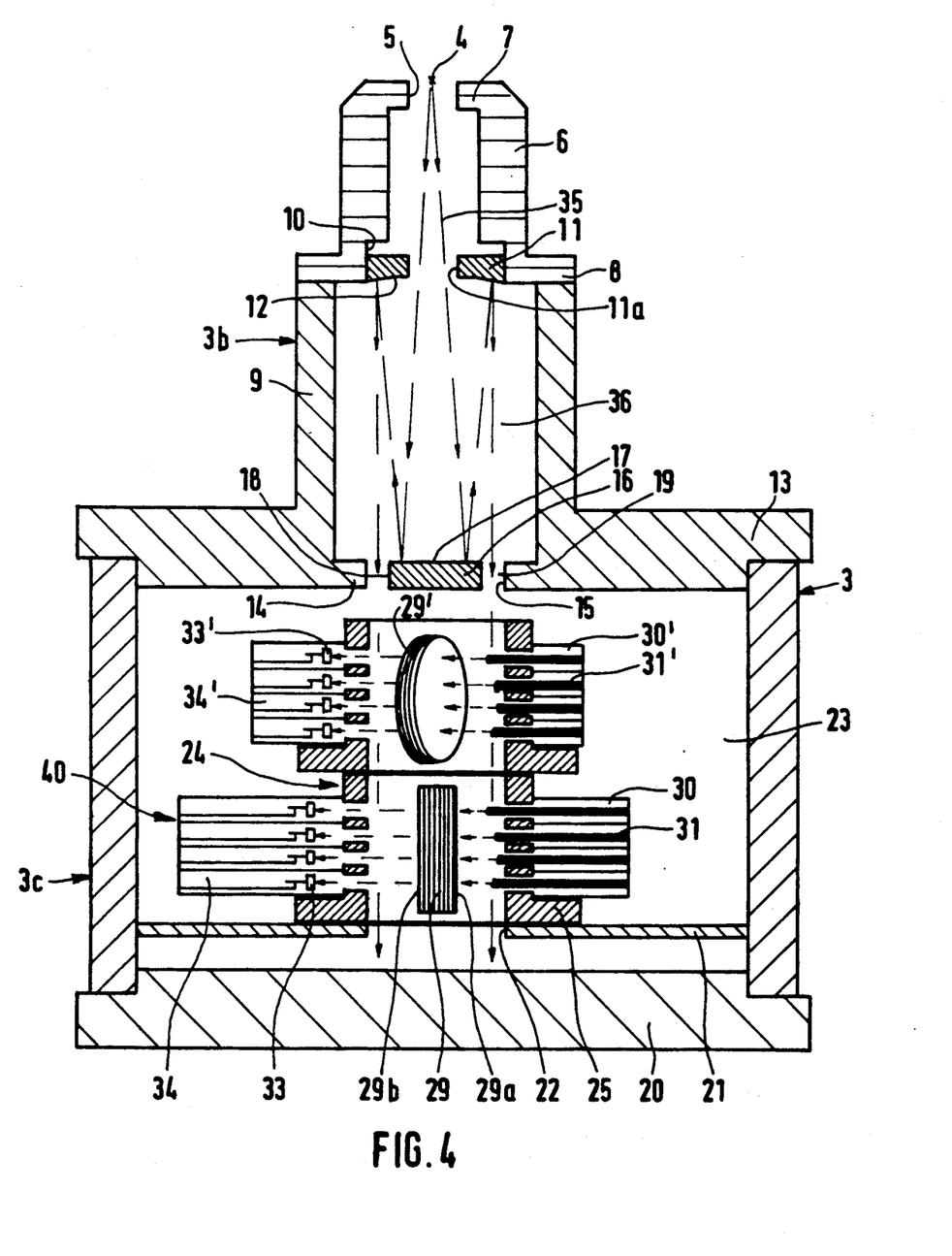
FIG. 4 is a longitudinal section of an apparatus according to a second preferred embodiment of the invention.
Figure 5:
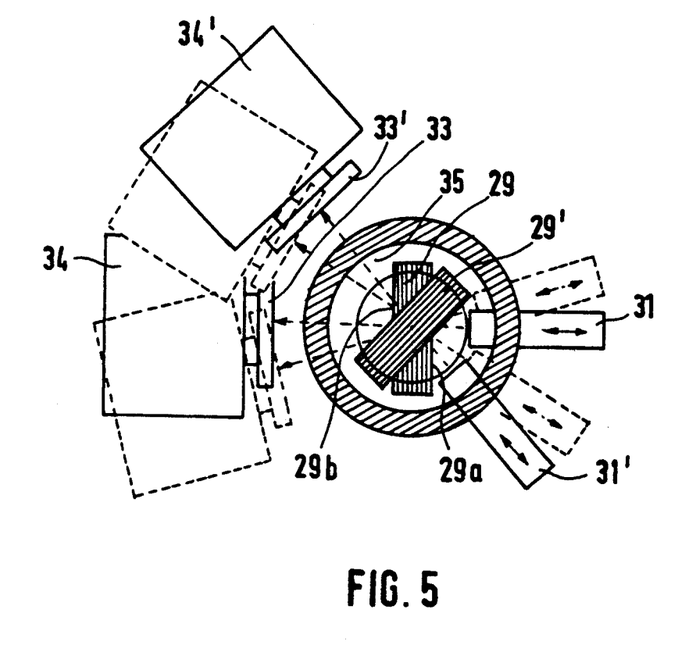
FIG. 5 is a top view of the apparatus shown in FIG. 4.

As explained above, in a further preferred embodiment of the invention, two or more interference filters are superposed at the center of the hollow-cylindrically collimated light beam and are relatively rotatable about a common axis essentially corresponding to the axis of the collimated light beam, as shown in FIGS. 4 and 5. The embodiment shown in FIGS. 4 and 5 is identical to the embodiment shown in FIGS. 1-3, except that a second interference filter 29' is superposed at the center of the hollow-cylindrically collimated light beam, and four deflecting mirrors 31' and associated photo-detectors 33' (with corresponding pre-amplifiers 34') are mounted in superposed planes and in pivotal manner about the second interference filter 29' on pivotal support plate 30'. Interference filters 29 and 29' are offset, the particular set of deflecting mirrors associated with the interference filter being axially and circumferentially shifted relative to the deflecting mirrors of the other interference filter, averting thereby mutual impediments among the deflecting mirrors of the individual planes. All elements of the embodiment shown in FIGS. 4 and 5 which are identical to elements of the embodiment of FIGS. 1-5 have been given identical reference numerals.

The illustrated interference spectrometer operates as follows:

A light beam 35 issuing from the light source (preferably via fiber optics) expands as a concial shell inside the case section 3a, then passes through the aperture 11a of the concave mirror 11 and is reflected from the specular surface 17 of the plane mirror 16 toward the concave specular surface 12 of the concave mirror 11. Because of the reflection at the specular surface 12, a hollow-cylindrically collimated light beam 36 is generated, which is made to pass through the annular aperture 19 in the bore 26 of the filter holder 24. Individual pencils of light are deviated from the specular surfaces 32 (slanting at 45°) of the deflecting mirrors 31, essentially perpendicularly to the longitudinal axis of the collimated light beam, and are made to impinge on the light incidence surface 29a of the interference filter 29.

Because the deflecting mirrors 31 are distributed radially about the interference filter and therefore are offset from one another, the individual pencils of light beams are stopped down at various sites of the collimated light beam. Furthermore, there is no danger of individual deflecting mirrors hampering each other. Depending on the orientation of the deflecting mirror in relation to the light incidence surface 29a of the interference filter 29, the deviated pencils of light impinge at different angles of incidence on the interference filter 29. Because the interference filter transmits light of different wavelengths depending on the light angle of incidence, as shown by the initial mathematical relation, light of wavelengths other than a desired wavelength will be separated out of each pencil of light. The filtered light will issue from the light exit surface 29b of the interference filter 29 and be detected in each case by the associated photo-detector 33.

We claim:

1. Apparatus for the simultaneous detection of several ranges of wavelengths of polychromatic light radiation, comprising:

optical guidance means for guiding an incident polychromatic light beam, said optical guidance means comprising:

means including a first system of mirrors located in the path of the incident polychromatic light beam for collimating said polychromatic light beam into a hollow-cylindrically collimated light beam, wherein one mirror of the first system of mirrors is mounted at the center of the collimated light beam, and means including a second system of mirrors, said second system including a plurality of deflecting mirrors located in the path of the hollow-cylindrically collimated light beam, for deflecting the collimated light beam essentially perpendicularly in respect to a conceptual outer surface of a hollow cylinder defined by the collimated light beam and radially in respect to the longitudinal axis of the hollow cylinder;

a photo-detector for each range of wavelength to be detected, said photo-detectors being mounted opposite the deflecting mirrors; and a common interference filter which filters the ranges of wavelengths to be detected out of the polychromatic light beam, said common interference filter being mounted in a path of the collimated light beam between the deflecting mirrors and the photo-detectors, the deflecting mirrors and the associated photo-detectors being pivotal about the interference filter; said filtered ranges of wavelengths depending on the orientation of the deflecting mirrors in relation to the interference filter.

2. An apparatus as claimed in claim 1, wherein the deflecting mirros and photo-detectors are pivotably affixed to a wall of a hollow-cylindrical filter holder at the center of which is the interference filter.

3. An apparatus as claimed in claim 1, wherein the interference filter is located essentially in a shadow of the mirror of the first system of mirrors mounted at the center of the hollow-cylindrically collimated light beam.

4. An apparatus as claimed in claim 1, wherein the first system of mirrors compries: means including a concave mirror with a central aperture for receiving the incident polychromatic light beam, means including a plane mirror located opposite the central aperture for reflecting the incident polychromatic light beam toward the concave mirror, and means for guding the collimated light beam past the plane mirror toward the second system of mirrors.

5. An apparatus as claimed in claim 4, wherein the plane mirror comprises a circular cross-section and wherein an outside diameter of the plane mirror essentially matches an inside diameter of the collimated light beam.

6. An apparatus as claimed in claim 5, wherein the deflecting mirrors are axially offset relative to the common interference filter.

7. An apparatus as claimed in claim 6, wherein each deflecting mirror and each associated photo-detector is mounted on a support plate rotatable about a longitudinal axis of the hollow-cylindrically collimated light beam.

8. An apparatus as claimed in claim 7, wherein the support plate comprises an essentially central circular clearance having a diameter which essentially corresponds to an outside diameter of a filter holder to which the support plates are affixed in rotatable manner.

9. An apparatus as claimed in claim 2, wherein nearly circumferential slots are present in the wall of the filter holder and are opposite light entry and exit surfaces of the interference filter, the slots opposite the light entry surfaces forming a guidance means for the deflecting mirrors and the slots opposite the exit surfaces forming passages for pencils of light issuing from the interference filter.

10. An apparatus as claimed in claim 1, wherein at least two interference filters are superposed at the center of the hollow-cylindrical collimated light beam, the interference filters being relatively rotatable about a common axis corresponding to an axis of the hollow-cylindrically collimated light beam.

11. An apparatus as claimed in claim 10, wherein each interference filter is located at a center of its own, coaxial, hollow-cylindrical filter holder, each holder having a wall to which the deflecting mirrors and associated detectors are pivotably affixed.

12. An apparatus as claimed in claim 1, whreein specular surfaces of the deflecting mirrors are formed each time by a slanted surface of a parallelipipedic prism of which the base surface essentially subtends a right angle to a longitudinal axis of the hollow-cylindrically collimated light beam.

13. An apparatus as claimed in claim 1, wherein the deflecting mirrors are radially displaceable in a plane perpendicular to a longitudinal axis of the hollow-cylindrically collimated light beam.

14. An apparatus as claimed in claim 1, wherein the interference filter is rotatably mounted about an axis of the hollow-cylindrically collimated light beam.

15. An apparatus as claimed in claim 1, wherein an interference filter support plate is rotatably mounted about an axis of the hollow-cylindrically collimated light beam.

16. An apparatus as claimed in claim 1, wherein pencils of light issuing from the interference filter are matched by means of optics in front of the photo-detectors to the particular size of the active detector surface.

* * * * *